Figure 1:
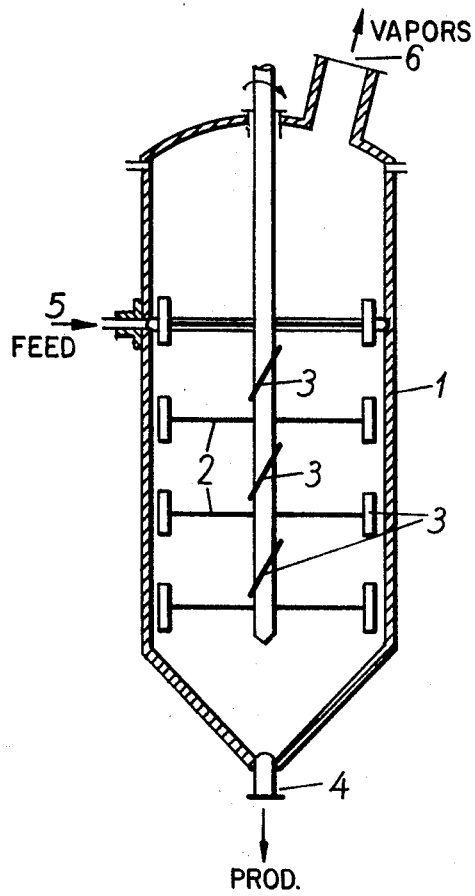

United States Patent

[11] 3,612,142

[72] Inventors: Federico Urgesi, Vercelli, Italy; Horst Rothert, Berlin, Germany
[21] Appl. No.: 850,293
[22] Filed: June 26, 1969
[23] Division of Ser. No. 519,836, Jan. 11, 1966, abandoned
[45] Patented: Oct. 12, 1971
[73] Assignees: Chatillon Societa Anonima Italiana per le Fibere Tessili Artificial S.p.A. Milan, Italy; Karl Fischer Apparate-u. Rohrleitungsbau Berlin (Borsigwalde), Germany
[32] Priority: Jan. 15, 1965
[33] Italy
[31] 814/65

[54] PROCESS AND APPARATUS FOR CONTINUOUSLY POLYCONDENSING OR POLYMERIZING MONOMERS
5 Claims, 5 Drawing Figs.
[52] U.S. Cl. ................................................ 159/6 W, 159/13
[51] Int. Cl. .............................................. B01d 1/22
[50] Field of Search ..................................... 159/6 W, 6 WH; 202/236; 203/89

[56] References Cited

UNITED STATES PATENTS

| | | | |
|---|---|---|---|
| 3,082,815 | 3/1963 | Keller | 159/6 W |
| 3,130,108 | 4/1964 | Eckstrom et al. | 159/6 W |
| 3,180,398 | 4/1965 | Belcher et al. | 159/6 W |
| 3,428,106 | 2/1969 | Johnston | 159/6 W |
| 2,546,381 | 3/1951 | Zahm | 159/6 W |
| 3,211,209 | 10/1965 | Latinen et al. | 159/6 W |

FOREIGN PATENTS

| | | | |
|---|---|---|---|
| 773,742 | 5/1957 | Great Britain | 159/6 W |

Primary Examiner—Norman Yudkoff
Assistant Examiner—J. Sofer
Attorneys—S. M. Clark and Willard L. G. Pollard ABSTRACT: There is provided apparatus particularly useful in the conduct of polymerization or polycondensation of a viscous monomer composition, which apparatus is characterized by means for continuously feeding a stream of material toward a peripheral-receiving zone of a surface and rotary means for spreading the material within said receiving zone on the surface in a thin layer to move on the surface toward a discharge zone thereof spaced from the receiving zone. In more specific embodiments, means are also provided for continuously heating the layer while it is on the surface. Means for continuously removing vapors issuing from the layer are also provided. Discharge means for removing the layer from the surface in the discharge zone are also provided.

3,612,142

PROCESS AND APPARATUS FOR CONTINUOUSLY POLYCONDENSING OR POLYMERIZING MONOMERS

This application is a division of Ser. No. 519,836 filed Jan. 11, 1966, now abandoned.

The present invention relates to a process and an apparatus for continuously producing macromolecular products by polycondensation or polymerization of monomers, said products being suitable for the manufacture of fibers and films and other products.

More particularly, the present invention relates to a process and an apparatus for polycondensing bis(2-hydroxyethyl)terephthalate which may or may not be combined with other monomers, such as esters of isophthalic acid.

The macromolecular products which can be produced by the present invention include polyamides which can be obtained for instance by polymerizing caprolactam.

As is well known in the art, polyethylene terephthalate is produced by polycondensation of bis(2-hydroxyethyl) terephthalate in the presence of a suitable catalyst, such as letharge, antimony sulfide, antimony trioxide etc., at a temperature from 240° to 320° C. and a pressure of 0.1–100 mm. Hg. As the viscosity of the reaction mixture increases as the degree of condensation proceeds, the composition comprising the monomer, glycol and the catalyst is initially highly liquid and is gradually converted into the viscous molten macromolecular product having a viscosity of 1,000–2,500 poise. This composition includes a surplus of ethylene glycol and it is necessary that this surplus be removed. This removal, however, becomes increasingly difficult as the viscosity of the composition increases. Where the process is carried out intermittently in the conventional manner, an improved separation of the surplus of glycol can be attained by agitation of the batch. In a continuous method, however, this method is impractical.

It is the object of the present invention to provide a process and an apparatus for continuously converting the monomer into the macromolecular product while continuously removing the surplus of ethylene glycol or the like with great efficiency.

It is another object of the present invention to provide a process and an apparatus for continuously converting a monomer of the types above referred to into a macromolecular product within a much shorter period of time than it was possible heretofore by means of conventional methods and apparatus.

Further objects of the present invention will appear from a detailed description of a preferred embodiment of the invention described hereinafter with reference to the accompanying drawings. It is to be understood, however, that the present invention is in no way limited to the details of such embodiments but is capable of numerous modifications within the scope of the appended claims and that the phrases and terms used in the description following hereinafter are not intended to restrict or limit the scope of the invention.

According to the present invention the method of polycondensing or polymerizing a monomer comprises the steps of continuously feeding a stream of said material towards a receiving zone of a surface, spreading said material on said surface within said zone in a thin layer, causing said layer to move on said surface away from said receiving zone towards a discharging zone spaced from said receiving zone, heating said layer, continuously removing any vapors issuing from said layer, and continuously discharging said material from said surface, when the layer reaches said discharging zone.

According to the invention, the apparatus for carrying out such process comprises means for continuously feeding a stream of said material towards a receiving zone of a surface, means for spreading said material within said zone on said surface in a thin layer and for causing said layer to move on said surface towards a discharge zone thereof spaced from said receiving zone, means for continuously heating said layer on said surface, means for continuously removing any vapors issuing from said layer, and means for continuously discharging said layer from said surface in said discharge zone.

In the drawings

Figure 2:
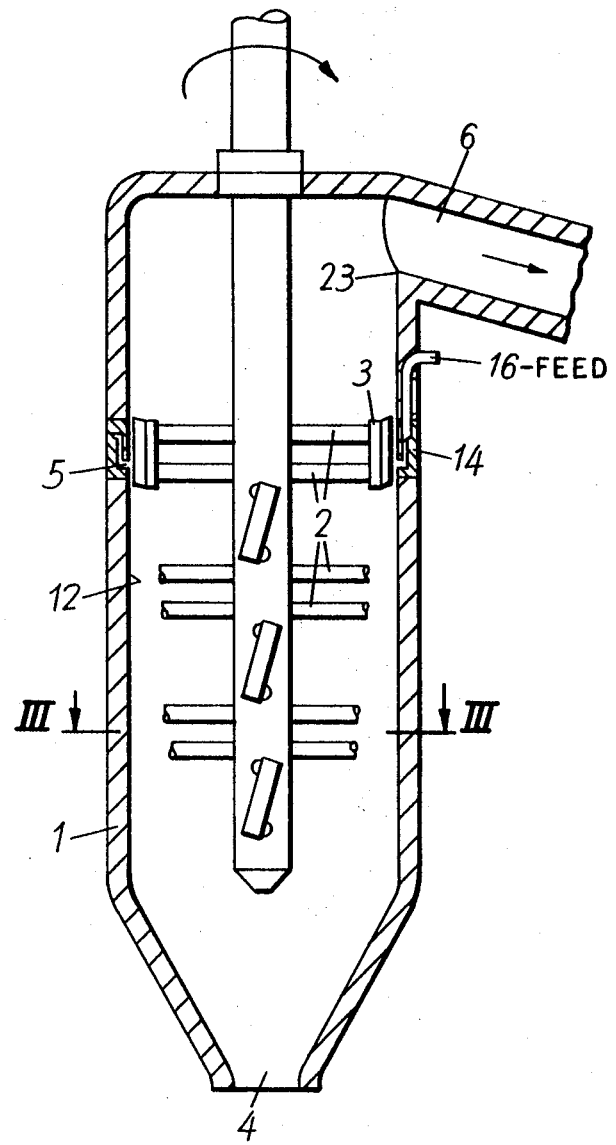
Figure 3:
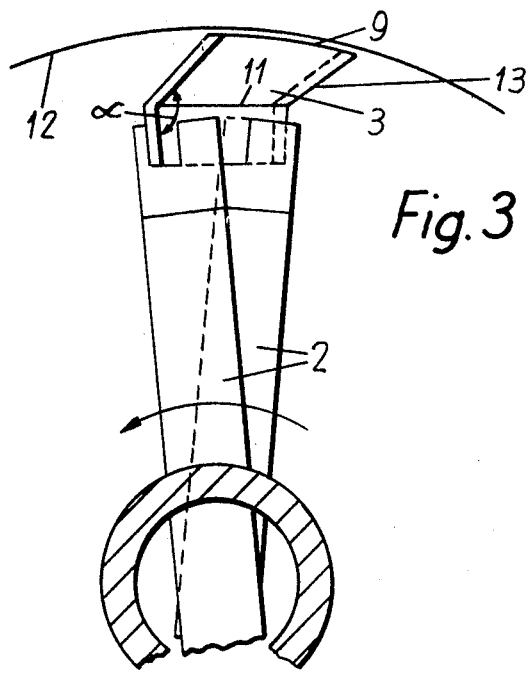
Figure 4:
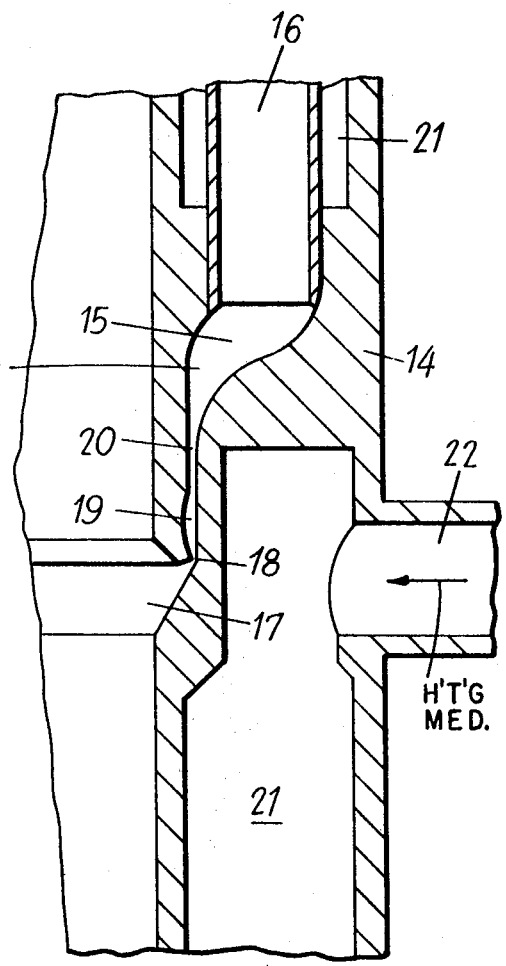
Figure 5:
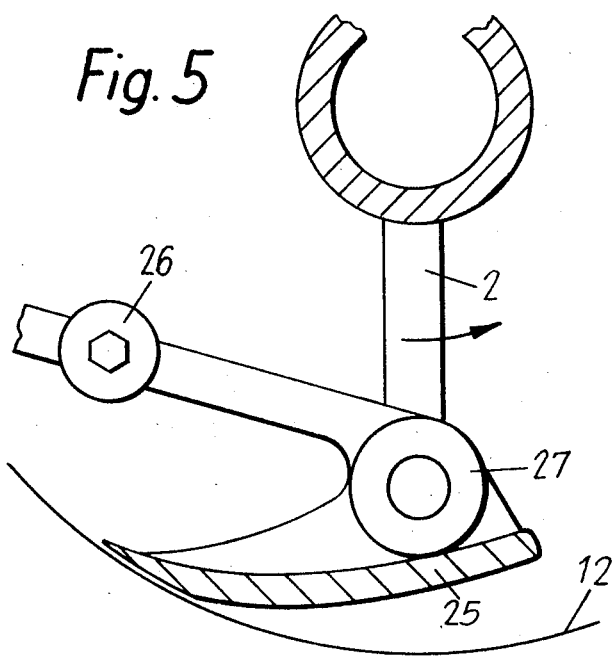

FIG. 1 illustrates a diagrammatic longitudinal section taken through the reactor vessel forming part of the apparatus according to the present invention, FIG. 2 is a longitudinal section taken through a somewhat modified design of the reactor vessel, FIG. 3 is the section taken along the line III—III of FIG. 2, FIG. 4 shows a detail of FIG. 2 on a larger scale and FIG. 5 is a section similar to that of FIG. 3 taken through another modification of the distributor vanes.

In FIG. 1 a cylindrical reactor vessel 1 is illustrated which is mounted in vertical position and is provided with suitable means for heating its wall. The monomer reacting compound which may be any one of the compounds described hereinafter in the examples 1, 2 and 3 is so continuously fed into the vessel 1 through an aperture 5 thereof that the compound will be uniformly spread and distributed over the internal surface of the vessel. For the purpose of spreading the compound, a rotary shaft is mounted within the vessel in coaxial relationship thereto and is provided with arms 2 carrying distributor vanes 3 which will spread the compound entering the opening 5 so as to form a uniform layer on the internal peripheral wall of the vessel 1, and are therefore not in contact with the wall. The vanes 3 are so inclined as to feed this layer downwardly. The thickness of the layer is reliably controlled by the vanes 3 and amounts to from 0.1–5 mm. or more. Preferably, the heating means comprise a hollow jacket completely surrounding the peripheral wall of the vessel and being fed with a suitable liquid or gaseous heating medium. The heat is so controlled as to obtain a maximum degree of reaction within a minimum period of time which the compound requires to pass through the vessel from the feed opening 5 to the discharge opening 4. At its top the vessel is provided with an opening 6 communicating with a source of vacuum whereby a low absolute pressure is maintained within the vessel. This is necessary in order to remove any vapors which will issue from the compound layer owing to the evaporization of volatile components of the reaction product, such an glycol. As a result, the thin layer of the compound is continuously subjected to the influence of the vacuum. The internal space of the vessel surrounded by the layer is occupied by the elements 1, 2 and 3 only but is otherwise empty. Suitable means are provided for producing the relative motion of the vessel and the shaft, for instance an electric motor mounted on the vessel and coupled with the upper end of the shaft projecting through a suitable bearing aperture provided in the top of the vessel.

Should it be found that the reaction product leaving the bottom opening 4 of the vessel has not attained the desired degree of polymerization, it may be continuously fed into the inlet opening 5 of a second vessel of the same type as that shown in FIG. 1. If desired, three or more such vessels may be arranged in tandem to attain the desired degree of polymerization.

The method performed by means of the apparatus shown in FIG. 1 will now be described in detail by reference to the following examples:

EXAMPLE 1

The compound to be continuously passed through a pair of vessels of the type shown in FIG. 1 arranged in tandem consists of bis(2-hydroxyethyl) terephthalate, of a nonreacting solvent such as glycol and of a suitable catalyst. The vessels arranged in tandem are kept under different pressures and, therefore, are separated by suitable barometric closure means. They are operated under the following conditions:

FIRST VESSEL

| | |
|---|---|
| Temperature of the compound | 250° C. |
| Absolute pressure | 25 mm. Hg. |
| Linear velocity of the edges of the vanes | 1 meter per second |
| Thickness of the layer per average | 1 mm. |
| Period of time of passage of the compound through the vessel | about 15 minutes |

SECOND VESSEL

| | |
|---|---|
| Temperature of the compound | 272° C |
| Absolute pressure | 2 mm. Hg. |
| Linear velocity of the vanes | 0.2 meter per second |

| | |
|---|---|
| Thickness of the layer per average | 1 mm. |
| Period of time of passage of the compound through the vessel | about 15 minutes |

The polycondensation product leaving the outlet opening 4 of the second vessel had a limit viscosity of 0.59 whereas that of the compound leaving vessel No. 1 amounted to 0.21.

EXAMPLE 2

A similar monomer compound as that described in example 1 consists of bis(2-hydroxyethyl) terephthalate and of a catalyst. This compound was passed through three vessels of the type illustrated in FIG. 1 arranged in tandem and kept under different absolute pressures as follows:

FIRST VESSEL

| | |
|---|---|
| Absolute pressure | 50 mm. Hg. |
| Temperature of the compound | 250° C. |
| Linear velocity of the vanes | 1 meter per second |
| Thickness of the layer | 1 mm. per average |
| Period of time of passage through the vessel | about 8 minutes |

SECOND VESSEL

| | |
|---|---|
| Absolute pressure | 20 mm. Hg. |
| Temperature of the compound | 265° C. |
| Linear velocity of the vanes | 0.4 meter per second |
| Thickness of the layer | 1.5 mm. per average |
| Period of time of passage through the vessel | about 12 minutes |

THIRD VESSEL

| | |
|---|---|
| Absolute pressure | 1 mm. Hg. |
| Temperature of the compound | 280° C. |
| Linear velocity of the vanes | 0.2 meter per second |
| Thickness of the layer per average | 1.5 mm. |
| Period of time of passage through the vessel | about 15 minutes |

The limit viscosity of the product leaving the vessel amounted to

| | |
|---|---|
| First vessel | 0.19 |
| Second vessel | 0.40 |
| Third vessel | 0.94 |

EXAMPLE 3

A prepolymerized product comprising polycaprolactam having a relative viscosity of 1.91 (measured in a solution of 1 gram of polymer in 100 ml. concentrated $H_2SO_4$) preferably continuously produced in a suitable prepolymerizing apparatus operating under atmospheric pressure is continuously fed to the intake opening 5 of the vessel and is treated therein under the following conditions:

| | |
|---|---|
| Absolute pressure | 2 mm. Hg. |
| Temperature of the Compound | 265° C. |
| Linear velocity of the vanes | 0.2 meter per second |
| Thickness of the layer per average | 1.5 mm. |
| Period of time of passage through the vessel | about 15 minutes. |

The polymerized product issuing from opening 5 of the vessel had a relative viscosity of 3.08.

It is desirable that the compound fed into the reactor vessel stays therein for a short period of time only. It has been found that this requirement is difficult to comply with, particularly within the zone of the entry of the compound. Because of the specific properties of the compound it is not possible to use conventional means such as overflow cascades.

As indicated in FIG. 1 the outer edges of the distributor vanes 3 are inclined with respect to the vertical elements of the cylindrical surface forming the internal wall of the vessel. These edges describe overlapping surface which are in close proximity to the internal wall of the vessel. As a result, the reaction compound is spread in a thin layer on the internal wall of the vessel and is fed downwardly towards the discharge opening 4. The surface described by the outer edges of the distributor vanes 3 overlaps the inlet opening 5 supplied with the compound.

Preferably, this inlet opening 5 is so shaped as to be distributed around the periphery of the vessel. This will now be described with reference to FIGS. 2–4.

As shown in FIG. 2, the vessel 1 adapted to be heated is shaped as a body of revolution, to wit as a cylinder. A shaft having distributor arms 2 is mounted within the vessel in coaxial relationship therewith. The vanes 3 mounted on the arms 2 have outer edges 9. These edges are inclined to the vertical elements of the cylindrical surface and describe overlapping surfaces. These surfaces are in close proximity to the internal wall 12 of the vessel for the purpose of feeding the compound downwardly lengthwise of the vessel in a thin layer. For this purpose each distributor vane 3 is carried by a pair of arms 2, the arms of each pair being disposed one above the other. The vane 3 comprises a plate of sheet metal bent along a straight edge line 11, the webs of the plate forming an obtuse angle 2 with each other. The outer web forming the edge 9 is so bent in a direction opposite to the rotary motion of the arms 3 as to form a dihedral angle with the internal surface 12 of the vessel. The viscous compound which is pushed by the vane 3 ahead in front of itself is urged into this dihedral angle and is thus caused to form a thin layer on the surface 12, the thickness of the layer amounting to the difference of the radius of the cylindrical surface 12 and the radius measured between the outer edge 9 of the vane and the axis of the rotary shaft. At the level of the topmost distributor vane the wall of the vessel is formed by an annulus 14, a longitudinal section of which is shown in FIG. 4. The annulus is formed with a circumferential cavity 15. The compound to be polymerized is supplied to the cavity 15 through one or more pipes, such as pipe 16 which is so mounted that its lower end communicates with the annular cavity 15. A peripheral groove 17 is provided on the internal surface of the vessel. Along its bottom 18 this groove communicates with a slot 19 provided in the annulus 14. The slot 19 communicates with the cavity 15 through a particularly narrow restricted passageway 20.

It is the function of this structure that the viscous compound supplied through the pipe 16 enters the groove 17 uniformly along the entire circumference thereof without being squirted out of the groove. The topmost distributor vanes 3 pass over the groove 17 and spread the compound in a thin layer on the internal surface 12 of the vessel in downward direction thus causing the compound to form a horizontal bead on the surface 12 beneath the lower edge 13 of the vane. This bead extends in peripheral direction on the surface 12 and is engaged by the next lower pair of distributor vanes after the arms 2 of the topmost vanes will have travelled through a quarter of a revolution. This next lower pair of vanes will spread the compound forming the bead downwardly again in a thin layer until this compound will form another bead below the lower edge of these vanes. This bead will again be engaged by the third pair of vanes (counted from the top) and will be spread downwardly. In this manner the compound moves in a thin layer downwardly towards the bottom opening 4.

The wall of the vessel is formed with a hollow jacket providing for an internal space 21, FIG. 4, through which a heating medium flows which is supplied by a pipe 22. The restricted passageway 20 controls the stream of compound passing therethrough in such a manner that the vacuum prevailing within the internal space of the vessel permits the material to enter the groove 17 in a uniform stream only.

Care must be taken that the vapors of the solvent will not condense at the top of the vessel and will not flow downwardly therefrom on the internal wall 12. For this reason the heating jacket extends only to the portion of the vessel located immediately above the inlet groove 17. Moreover, a discharge pipe 6 communicating with an outlet opening provided in the peripheral wall of the vessel near the top thereof is preferably downwardly inclined by about 10° as shown in FIG. 2 for the purpose of preventing the liquid condensed in the pipe 6 from flowing into the vessel and causing this liquid to flow outwardly through the pipe 6. For the same reason the innerlower edge 23 of the pipe 6 forms an acute edge.

The material to be polymerized has the property that its cohesion forces determining the strength of the layer formed by the distributor vanes are higher than the forces of adhesion of the compound on the internal walls of the vessel and on the distributor vanes.

The output of the apparatus in which the compound is spread in a thin layer depends essentially on the shape and surface quality of the distributor vanes. Preferably, the surface is carefully finished so as to be quite smooth, preferably by a grinding and polishing operation. Owing to this surface quality of the vanes and owing to the above mentioned difference of the cohesion forces from the adhesion forces of the compound it will not be necessary for feeding the compound to scrape it from the surface on which it is spread. The distributor vanes will rather insure the continuity of the layer produced on the internal surface of the vessel and will promote the downward flow of the compound under the effect of its own weight.

In FIG. 5 a modified structure of a distributor vane is shown. It is the object of this modification that the thickness of the layer will vary in response to a change of the conditions of operation of the apparatus. For this purpose each distributor vane is formed by a body 25 mounted on the arm 2 for outward movement, the body 25 being connected with a flyweight 26. This can be effected by mounting the body 25 provided with the flyweight 26 for pivotal movement on the arm 2 about an axis parallel to the longitudinal axis of the evaporator which is preferably vertically disposed. The body 25 responds to an increase of the rotary speed of the shaft by an outward movement caused by the centrifugal force of the flyweight, whereby the gap existing between the outer edge of the body 25 and the internal wall 12 of the vessel is rendered more narrow. It has been discovered that this radial movability of the distributor vanes will reduce the required power for rotating the shaft. Moreover, the distributor vanes 25 will be enabled to more easily pass across any lumps or uneven portions existing in the layer of compound owing to the radial movability of the vanes.

Preferably, the vessel which is shaped cylindrically with the region of operation of the vanes tapers towards the outlet 4 below this region, the lower portion of the vessel being shaped conically. However, the surface 12 of revolution of the internal surface of the vessel need not be a cylinder. It may have any other shape, even though the cylinder is the preferred shape of the body of revolution.

A reaction vessel as shown in FIG. 1 having the following dimensions has been found satisfactory for the purpose of practicing the process explained hereinabove with reference to the examples 1, 2 and 3.

The internal height of the vessel amounts to 2,800 mm. Its internal diameter amounts to 480 mm. The width of the distributor vanes 3 amounts to 200 mm. The internal diameter of the exit opening 4 amounts to 145 mm. The internal diameter of the pipe 6 amounts to 150 mm. and its inclination to about 10°. The described example of the apparatus is capable of numerous modifications.

From the above description of the novel process for polymerizing or polycondensing a nonsolid, viscous monomer material it will be understood that this process, broadly speaking, comprises continuously feeding a stream of said material, such as that supplied by pipe 16, towards a receiving zone of a surface which may be the zone containing the groove 17, spreading said material on said surface within said receiving zone in a thin layer, causing said layer to move on said surface away from said receiving zone towards a discharging zone spaced from the receiving zone, heating said layer, continuously removing any vapors issuing from said layer and continuously discharging said material from said surface, when the layer reaches said discharging zone. In the example of the apparatus shown in FIG. 2, the discharging zone of the surface is the bottom zone of the internal surface of the vessel surrounding the discharge opening 4.

From the foregoing it will be seen that this invention is one well adapted to attain all of the ends and objects hereinabove set forth together with other advantages which are obvious and which are inherent to the process and to the apparatus.

The advantages of the invention as here outlined are best realized when all of its features and instrumentalities are combined in one and the same structure, but useful devices may be produced embodying less than the whole.

While the invention has been described in connection with a number of preferred embodiments thereof, it will be understood that it is capable of further modification and that this application is intended to cover any variations, uses, or adaptations of the invention.

What we claim is:

1. An apparatus for polymerizing or polycondensing a viscous monomer material comprising a substantially vertically axised cylindrical vessel of circular cross section and having means for continuously feeding a stream of said material toward a receiving zone in the wall of said vessel including a circumferential slot located within the wall of said receiving zone opening into the vessel interior for receiving said stream, rotary means for spreading said material within said zone on the interior surface of said wall in a thin layer in the range from about 0.1 mm. to about 5 mm., and for causing said layer to move on said surface toward a discharge zone thereof spaced from said receiving zone, said rotary means including a shaft, arms carried by said shaft and distributor vanes mounted on said arms, the outer leading edges of said vanes being inclined and describing during rotation overlapping cylindrical band surfaces spaced away from but less than about 5 mm. from the internal surface of said vessel, and thereby urging said material away from said receiving zone and in a direction having a component directed toward said discharge opening, means for continuously heating said layer on said surface, means for continuously removing any vapors issuing from said layer, and means for continuously discharging said layer from said surface in said discharge zone.

2. An apparatus for polymerizing or polycondensing a viscous monomer material comprising a vertically axised cylindrical reactor vessel having an internal surface constituting the surface of a body of revolution, means for feeding a continuous stream of said viscous material to a peripheral zone of said surface including a circumferential slot located in the wall of said peripheral zone opening into the vessel interior for receiving said stream, said vessel being provided with a discharge opening axially spaced from said zone, rotary means mounted for rotation about the axis of said internal surface for spreading said material on said internal surface in a thin layer in the range from about 0.1 mm. to about 5 mm., said rotary means including a shaft, arms carried by said shaft and distributor vanes mounted on said arms, the outer leading edges of said vanes being inclined and describing during rotation overlapping cylindrical band surfaces spaced away from but less than about 5 mm. from the internal surface of said vessel, and thereby urging said material away from said receiving zone and in a direction having a component directed toward said discharge opening, and means for continuously maintaining the interior space of said vessel in a substantially evacuated condition.

3. Apparatus as claimed in claim 2 in which said vessel has a wall provided with an internal duct communicating with said slot by a passageway of restricted cross section.

4. An apparatus as claimed in claim 2 in which said vessel is provided with a vapor-collecting space above said peripheral zone and with an outlet duct communicating with the top of said vapor-collecting space, said outlet duct being outwardly and downwardly inclined.

5. An apparatus as claimed in claim 2 in which said body of revolution has an adjoining tapering section extending towards said discharge opening.